C. N. LAPLANT & J. W. GRACE.
WHEEL.
APPLICATION FILED JUNE 13, 1913.
1,101,083.
Patented June 23, 1914.
2 SHEETS—SHEET 1.
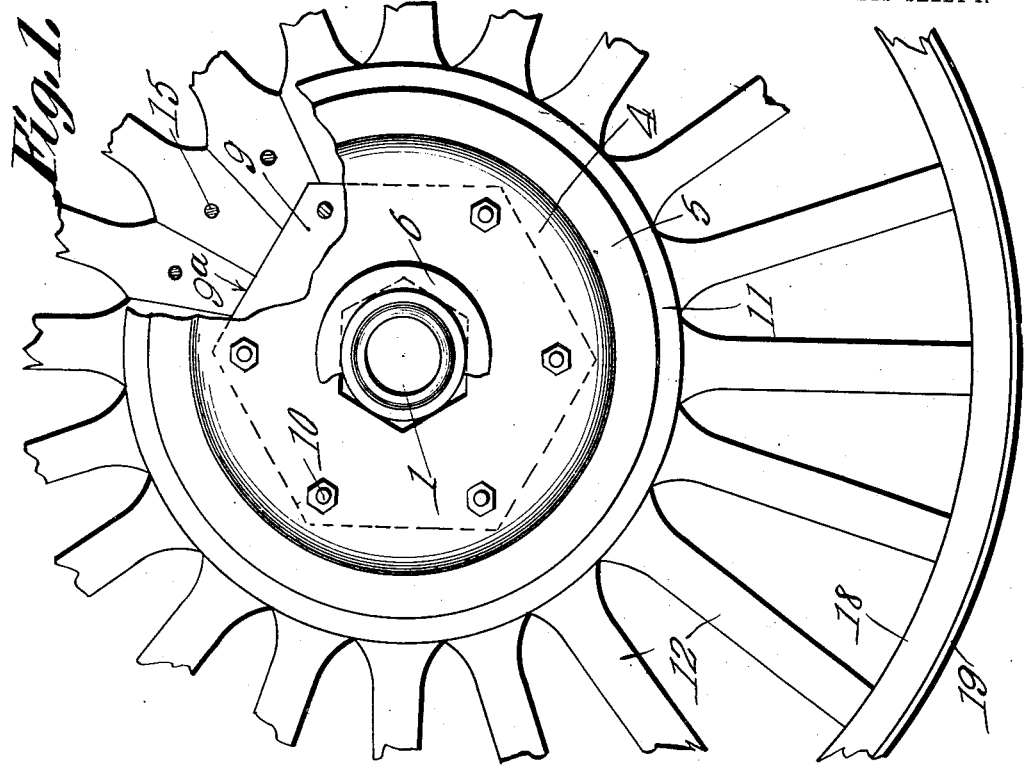
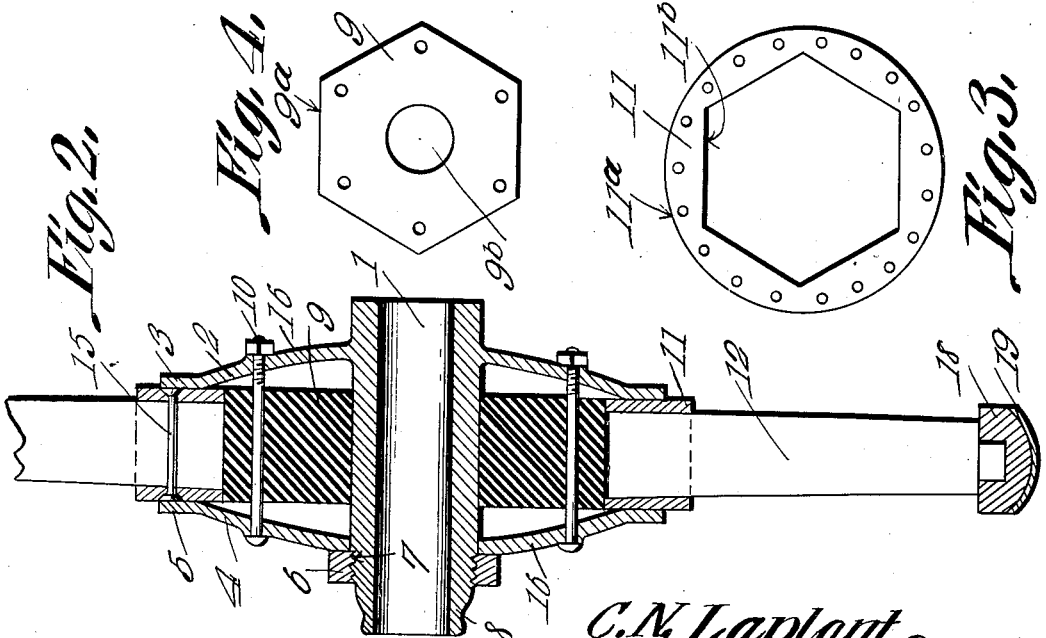
Witnesses
C. N. Laplant and
J. W. Grace, Inventor
by
Attorneys

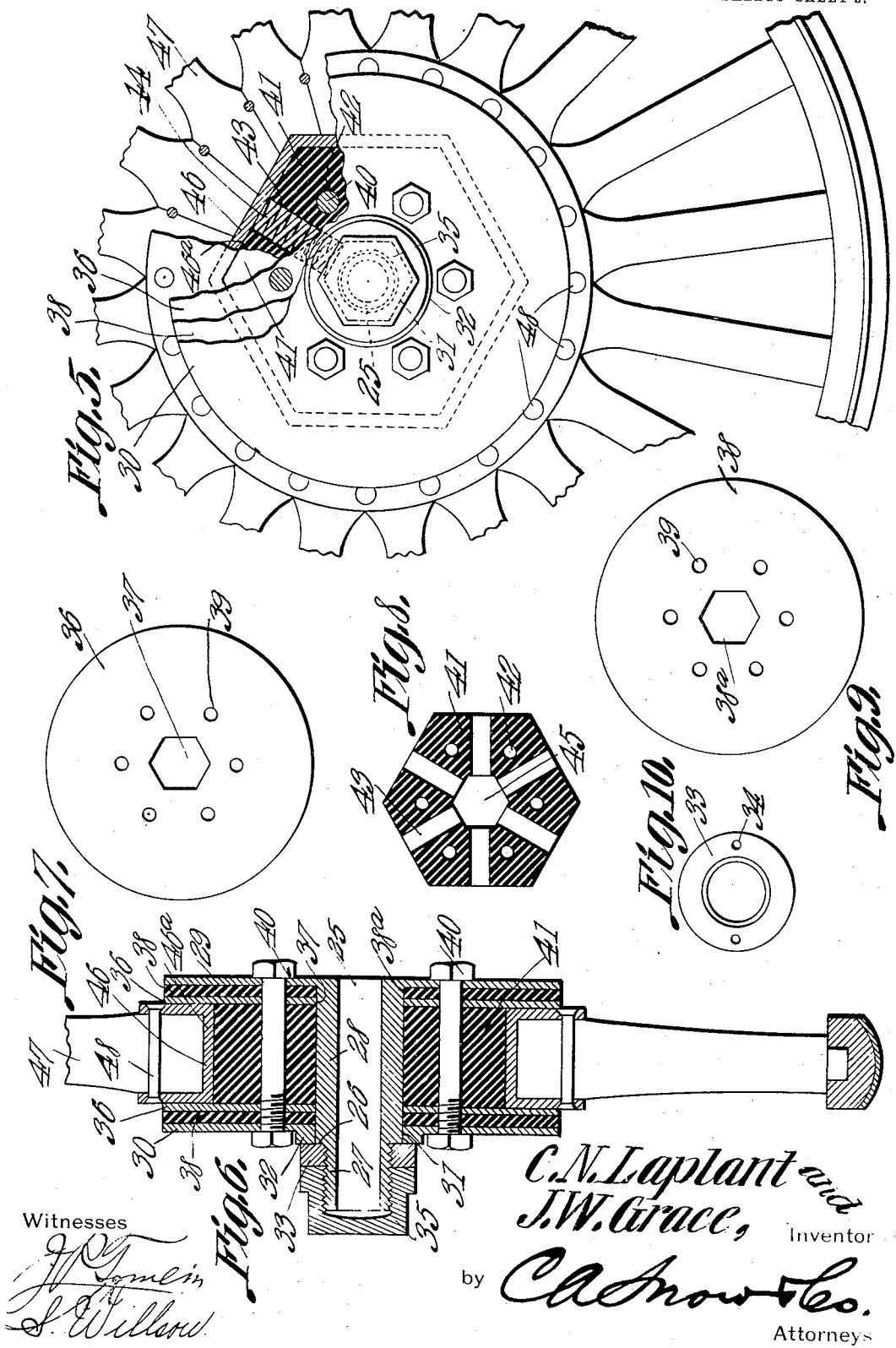

UNITED STATES PATENT OFFICE.

CHARLES N. LAPLANT AND JOHN W. GRACE, OF BURLINGTON, VERMONT.

WHEEL.

1,101,083.  Specification of Letters Patent.  Patented June 23, 1914.

Application filed June 13, 1913. Serial No. 773,521.

*To all whom it may concern:*

Be it known that we, CHARLES N. LAPLANT and JOHN W. GRACE, citizens of the United States, residing at Burlington, in the county of Chittenden, State of Vermont, have invented a new and useful Wheel, of which the following is a specification.

One object of the present invention is to provide a novel form of resilient hub for a vehicle wheel, whereby pneumatic tires may be dispensed with.

Another object of the present invention is to provide novel means for assembling the spoke holding element with the resilient hub block, to afford the necessary yielding in the component parts of the wheel.

It is within the scope of the invention to improve generally and to enhance the utility of, devices of that type to which the present invention appertains.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing:—Figure 1 shows one form of the invention in side elevation, parts being broken away; Fig. 2 is a fragmental transverse section of the structure shown in Fig. 1; Fig. 3 is an elevation of one of the spoke plates; Fig. 4 is an elevation of the resilient hub block; Fig. 5 is a side elevation showing a modified form of the invention, parts being broken away; Fig. 6 is a transverse section of the structure shown in Fig. 5; Fig. 7 is a plan of one of the retaining plates; Fig. 8 is a cross section of the resilient hub block; Fig. 9 is a plan of one of the resilient wear plates; and Fig. 10 is a plan of one of the locking nuts which are applied to the hub.

In carrying out the invention as depicted in Figs. 1, 2, 3 and 4, there is provided a tubular hub 1 from which projects a fixed side plate 2 having adjacent its periphery a flat bearing area 3 located parallel to the median plane of the wheel. One end of the hub 1 is inserted through an opening formed at the center of a removable side plate 4, the side plate 4 having adjacent its periphery, a flat bearing area 5 located parallel to the median plane of the wheel and parallel to the flat bearing area of the side plate 2. The removable side plate 4 is held in place by means of a nut 6 mounted upon a threaded portion 7 of the hub 1, the hub 1 being tapered beyond the nut 6 as indicated at 8, to facilitate the mounting of the nut 6 in place.

Located between the side plates 2 and 4 and surrounding the hub closely is a resilient block 9, preferably fashioned from rubber, the periphery of the block 9 being polygonal and ordinarily hexagonal as indicated at $9^a$. In the center of the block 9 there is a circular opening $9^b$ which is adapted to receive the hub 1. Bolts 10 or other securing elements adapted to a like end are extended through the side plates 2 and 4 and through the block 9.

A spoke-carrying structure is provided, the same including spoke-plates 11, the peripheries of which are circular as indicated at $11^a$. In each of the spoke plates 11 there is a polygonal opening $11^b$, the same being hexagonal so as to fit closely about the periphery of the block 9. The spokes 12 are received at their inner ends between the spoke plates 11, the spokes being held between the spoke plates by means of securing elements 15 passing through the spoke plates and through the inner ends of the spokes. The inner ends of the spokes 12 abut against the polygonal faces of the block 9. The spokes 12 carry at their outer ends a rim 18 which may be equipped with a metal tire 19, although a tire of any other construction may be employed when considered expedient.

As indicated at 16, the side plates 2 and 4 are convexed in opposite directions so as to space the side plates apart from the lateral faces of the resilient block 9. The flat bearing areas 3 and 5 of the side plates 2 and 4 respectively are slidably engaged with the outer faces of the spoke plates 11. These flat bearing areas 3 and 5 extend across the ends of the securing elements 15.

As will be understood readily, the spoke-carrying structure is free to reciprocate transversely of the hub 1, the inner ends of the spokes 12 and the inner edges of the spoke plates 11 bearing against the periphery of the resilient block 9. The block 9 thus serves to support the spoke-carrying structure yieldably and will afford the desired resiliency. Owing to the fact that the side plates are spaced apart from the block 9 as indicated at 16, the block 9 is free to expand laterally, when under compression. The spoke carrying structure is held for right line movement at right angles to the axis of the hub 1 by the bearing areas 3 and 5, and since the side plates 2 and 4 extend across the ends of the securing elements 15, an accidental displacement of these members will be impossible.

Owing to the fact that the openings 11$^b$ in the spoke plates 11 are polygonal, and owing to the fact that the polygonal periphery of the resilient block 9 is engaged in the openings 11$^b$, a rotation of the spoke carrying structure upon the resilient member 9 cannot take place.

Referring to the modification shown in Figs. 5 and following, the tubular hub is denoted by the numeral 25 and is provided adjacent its free end with a shoulder 26, beyond which the hub 25 terminates in a reduced, threaded spindle 27. The intermediate portion of body 28 of the hub 25 is of polygonal outline, and ordinarily is hexagonal. At one end, the hub 25 carries a fixed side plate 29. A removable side plate 30 is provided, the same having a central, polygonal opening 31 adapted to fit against rotation upon the polygonal body 28 of the hub 25. The removable side plate 30 is equipped with an outstanding hub 32, engaged by a nut 33, threaded on the spindle 27 of the hub. The nut 33, as shown in Fig. 10, may be provided with holes 34, adapted to receive the studs of a spanner. A cap nut 35 is threaded on the free end of the spindle 27 and bears against the nut 33.

A pair of retaining plates 36 are mounted upon the hub 25, the retaining plates 36 having polygonal openings 37 which receive, against rotation, the polygonal body portion 28 of the hub. Resilient plates 38, preferably fashioned from rubber, are inserted between the side plates and the retaining plates 36, the plates 38 being provided with polygonal openings 38$^a$ which receive, against rotation, the polygonal body portion 28 of the hub 25. In the side plates 29 and 30, in the plates 36, and in the plates 38 there are openings 39, adapted to receive securing elements 40 which may be bolt and nut structures. A resilient block 41, preferably fashioned from rubber, is provided, and lies between the retaining plates 36, the block 41 being held against lateral movement by the retaining plates. There are openings 42 in the block 41, through which the securing elements 40 pass. The block 41 is provided with radial seats 43, receiving helical compression springs 44, the inner ends of which abut against the polygonal faces of the body 28 of the hub 25. The block 41 is equipped with a central opening 45, of polygonal outline, and embracing the polygonal body 28 of the hub 25 to prevent independent rotation between these parts. A spoke holder 46 is provided, the spoke holder being of channel shape in transverse section. The spoke holder 46 is equipped with a polygonal opening 46$^a$ in which the block 41 fits closely. The outer ends of the springs 44 abut against the spoke holder 46. The spokes 47 are located between the side flanges of the spoke holder 46 and abut against the inner part or base of the spoke holder. Securing elements 48 pass through the side flanges of the spoke holder 46 and engage the spokes 47. The retaining plates 36 serve to receive the wear incident to the movement of the spoke holder 46 transversely of the hub 25. The resilient plates 38 act as gaskets and serve to take up lateral or horizontal jars.

Having thus described the invention, what is claimed is:—

1. In a wheel, a hub; a resilient block surrounding the hub and provided with radial recesses which are spaced from the side faces of the block; springs completely housed in the recesses and held against lateral flexure throughout their length by the walls of the recesses; and a spoke holder surrounding the block and engaged by the springs.

2. In a wheel, a hub; a resilient block surrounding the hub and provided with radial recesses spaced from the side faces of the block; springs seated in the recesses; a spoke holder surrounding the block and engaged by the springs; side plates mounted on the hub; and securing elements engaged with the side plates and passing through the block between the recesses therein.

3. In a wheel, a hub; a resilient block surrounding the hub; a spoke holder surrounding the block and of the same width as the block; wear plates abutting against the side faces of the block and of the spoke holder; resilient plates abutting against the outer side faces of the wear plates; side plates on the hub and engaging the outer side faces of the resilient plates; and a securing device passing through the side plates, through the resilient plates, through the wear plates and through the block.

In testimony that we claim the foregoing as our own, we have hereto affixed our signatures in the presence of two witnesses.

CHARLES N. LAPLANT.
JOHN W. GRACE.

Witnesses:
SARA A. GORMAN,
LUCIA F. BROOKS.